2 Sheets—Sheet 1.

C. H. WILLIAMS,

Assignor to CLEVELAND CITY FORGE AND IRON CO.

DIE FOR MAKING CAR COUPLING PINS.

No. 9,826. Reissued Aug. 2, 1881.

Witnesses.
J. H. Burridge
M. G. Deloring

Inventor.
C. H. Williams
W. H. Burridge atty

N. PETERS, Photo-Lithographer, Washington, D. C.

C. H. WILLIAMS,

Assignor to CLEVELAND CITY FORGE AND IRON CO.

DIE FOR MAKING CAR COUPLING PINS.

No. 9,826. Reissued Aug. 2, 1881.

Witnesses.
J. H. Burridge
M. L. Deering

Inventor.
C. H. Williams
W. H. Burridge, atty.

N. PETERS, Photo-Lithographer, Washington, D. C.

UNITED STATES PATENT OFFICE.

CHARLES H. WILLIAMS, OF CLEVELAND, OHIO, ASSIGNOR TO CLEVELAND CITY FORGE AND IRON COMPANY, OF SAME PLACE.

DIE FOR MAKING CAR-COUPLING PINS.

SPECIFICATION forming part of Reissued Letters Patent No. 9,826, dated August 2, 1881.

Original No. 140,981, dated July 15, 1873. Application for reissue filed June 21, 1881.

*To all whom it may concern:*

Be it known that I, CHARLES H. WILLIAMS, of Cleveland, in the county of Cuyahoga and State of Ohio, have invented certain new and useful Improvements in Dies for Making Railway-Car Coupling-Pins, of which the following is a full, clear, and exact description, reference being had to the accompanying drawings, and the letters of reference marked thereon, making part of this specification, in which—

Figure 1:
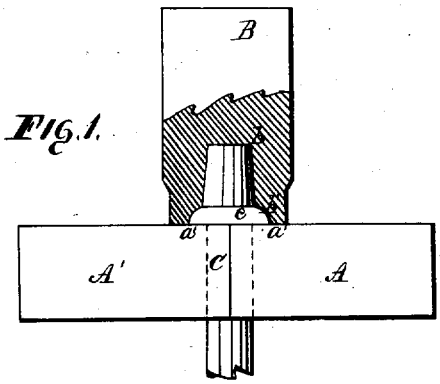
Figure 2:
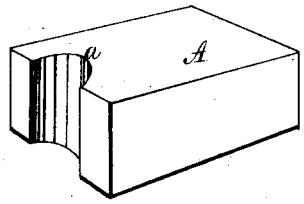
Figure 3:
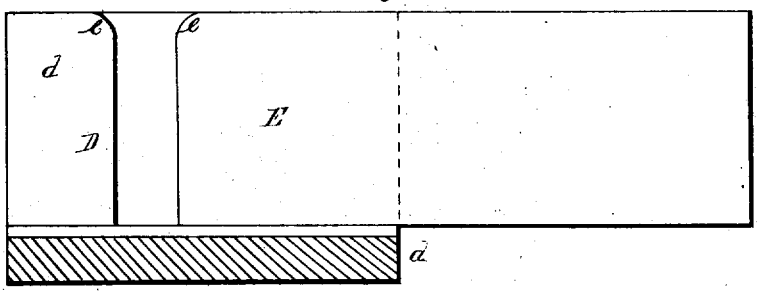
Figure 4:
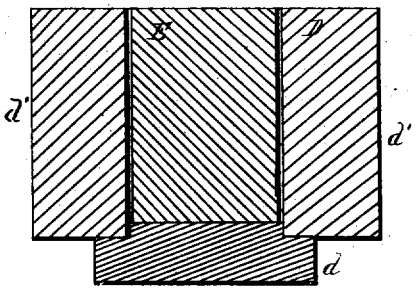
Figure 8:
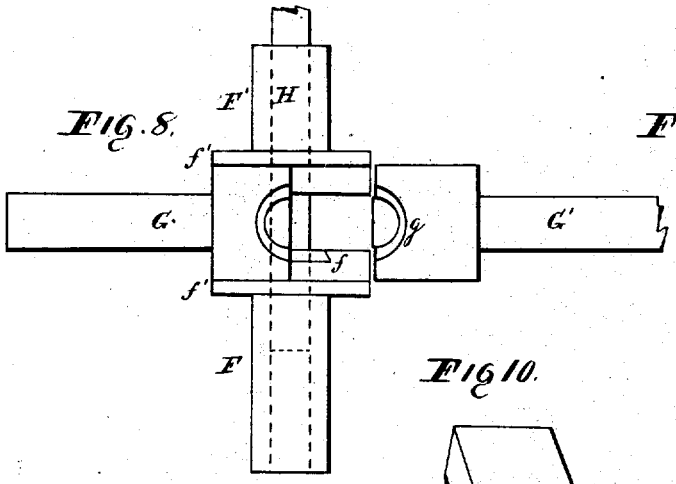
Figure 9:
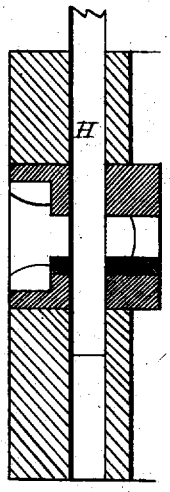
Figure 10:
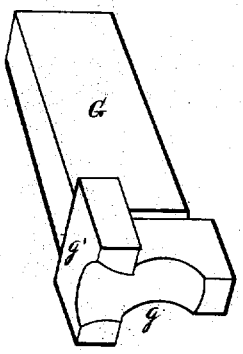
Figure 11:
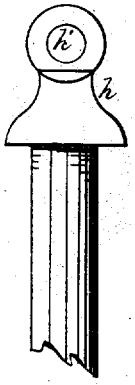
Figure 14:
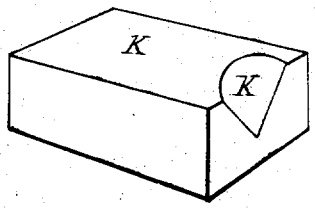
Figure 12:
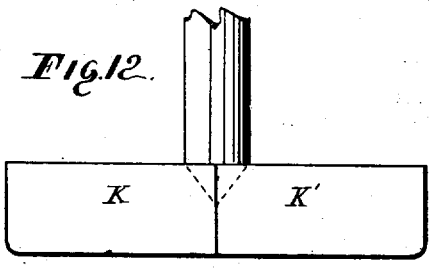
Figure 13:
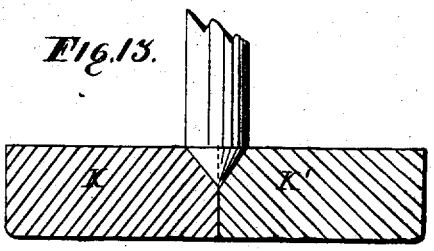

Figure 1 is a front-plan view, partly in section, of the clamping-dies, heading-die, and the pin. Fig. 2 is a perspective view of one of the clamping-dies. Fig. 3 is a front-plan view of the compound dies for flattening and drawing out the stock. Fig. 4 is a horizontal sectional view of Fig. 3. Figs. 5, 6, 7, and 11 are front elevations of the pin in different stages of its formation. Fig. 8 is a front elevation of the dies for necking the pin and the punch for forming the chain-eye therein. Fig. 9 is a vertical sectional view of Fig. 8. Fig. 10 is a perspective view of one of the necking-dies. Fig. 12 is a front-plan view, partly in section, of the pointing-dies. Fig. 13 is a longitudinal sectional view of Fig. 12. Fig. 14 is a perspective view of one of the pointing-dies.

Like letters of reference refer to like parts in the several views.

My present invention is an improvement on the dies embraced in and covered by Letters Patent No. 110,179, issued to me December 13, 1870; and it consists in an improved form and arrangement of dies which enable me, through all its stages or parts, to develop a perfect coupling-pin for railroad-cars. Therefore, while my present invention is identical in principle with that embraced in my patent, it has as its object the removal of difficulties in the forming of the pin which practical experience in working my former dies has demonstrated.

In my present improvement, the first operation consists in developing the collar, and my clamping and heading dies are of such contour and are so arranged as to form the same on the ordinary round bar of merchantable iron, cut to any proper or desired length, and which enables me to make a collar of uniform dimensions and regular in outline throughout, and which I have found is not the case if the head of the bar has been previously flattened, as in my former patent; and, besides, I am thus enabled, with this set of dies, in connection with the pointing-dies, to produce an article which in itself is marketable, and for many purposes as useful as is the finished pin, or the pin which has been subjected to the action of the entire series of dies; and herein lies the great advantage of my improvement. The first operation of the dies produces a pin—a round coupling-pin having a solid collar, and with any desired length of stock, for convenience of handling, above the collar, and which, when pointed, is in itself a new article of manufacture, but not a perfectly-finished pin, but yet such a pin that when it is finished, by being subjected to the action of the other dies, will have a collar that is regular and uniform throughout, and which is a result never before attained in a die-pressed pin.

The next stage of the operation consists in flattening and drawing out the stock above the collar, which is done by a compound die instead of a solid die, as in my former patent, and which permits me to construct the dies in sections, whereby I am enabled to refit or reface the surfaces of the same without enlarging the cavity, and which adds greatly to the duration and durability of the die.

The next stage of the operation consists in necking and punching the flattened head of the pin by dies arranged as in my former patent, but which are entirely different in their form and construction. The dies of the patent neck the pin simply by curving the lateral sections of the flattened head, and do not encircle and press the entire surface of the pin, as do the dies in my present improvement, and which are so faced that, when they meet, they form and leave walled cavities that press the head and neck to a true and perfect form, and which dies work between the dies that retain the head of the pin during the operation of necking and punching.

I will now describe the construction and operation of this improvement.

The machinery by which I propose to operate the dies may be essentially the same as that described in my patent of December 13, 1870, which I have not shown in the accompanying drawings, and which need not be referred to here; but my description refers to the form and arrangement of the dies, and to which my claims are restricted, as it is these, and these alone, which constitute the present improvement on the invention embraced in my former patent. Instead of first flattening the handle and then forming the collar, as therein described, I reverse the operation—that is, I first form the collar, and then flatten and draw out the head, employing for that purpose dies of the contour and arrangement as shown on Sheet 1.

A A′ are the clamping-dies, and are constructed of any suitable material, and are counterparts of each other. The die A is stationarily secured in the machine, while the die A′ is movable, being so secured as to allow of its traveling toward or receding from the die A, as the conditions of the operation may require. These dies are of the form shown at A, Fig. 2, and their cavities *a a* are such that when they meet they leave an opening which corresponds precisely to the form of the round iron bar which they are designed to secure, the diameter of this opening being such relatively to the dimensions of the bar that when the dies close around the same, as shown in Fig. 1, they shall retain it with a strong clamping gripe.

Figure 5:
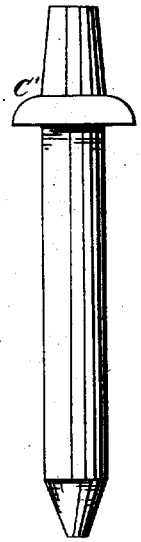

B is the heading-die, and is of the form shown in Fig. 1, having a socket, *b*, of such form and dimensions as will permit it to pass over and fit snugly around the end of the bar. This socket-opening or recess leads into or terminates in a curved or flaring cavity, *b′*, and forms the collar *c* on the round bar or pin C, by pressing the metal out so as to fill the cavity *b′*, and down on the flat surfaces *a a′* of the dies A A′. These dies A, A′, and B are arranged, and relatively so act, that the die A′ is moved back, so as to permit of the bar being inserted. The die A′ then returns and in connection with the stationary die A clamps the bar, and at such sections thereof as to leave sufficient stock above the surfaces *a a′* of the dies to fill the socket *b* and its cavity *b′*, and thus form the collar *c* through the forward movement and pressure of the die B, the cavity *b′* forming the upper and rounded surface thereof, and the faces *a a′* of the dies giving a flat under surface to the collar, such as is clearly shown in Figs. 1, 5, 6, 7, and 8. The socket or section *b* of the cavity in the heading-die B is not of uniform diameter throughout its entire length, but very nearly so. From the flaring section *b′* it slightly contracts, giving to the socket *b* a contour which is conical, but the taper of which is exceedingly gradual and slight, and which through the action of the die leaves such an elevation of the pin above the collar and of such a form as is shown in Fig. 5. The great advantage of this form of socket over a socket of uniform diameter throughout is that it permits the die readily to be drawn off the bar. These dies A′ and B are so secured that they each travel on the same plane, but are moved on lines at right angles to each other, the forward movement of the die B forming the collar, and the die A′ being alternately moved forward and backward to secure and release the pin. The action of these dies completes the first operation, and produces a round bar, having a regular and continuous collar, and which is of uniform dimensions throughout. The round bar, having a collar thus developed thereon, through the action of the dies A, A′, and B, is now pointed through the action of the dies K K′, Sheet 2. These dies are the same in form and function as are the dies G $G^2$ of my former patent. The die K is stationary, and the die K′ is movable. These dies, as to the form of their cavities, are counterparts of each other, and when they are brought together their cavities *k*, meet and form one continuous conical recess or cavity, and through their joint action point the bar, giving to the end of the pin the form shown at *k′*, Fig. 5. The bar, after being subjected to the action of the dies A A′ B and the dies K K′, is without any further operation converted into a coupling-pin for cars, and one which is merchantable, and which for many purposes in connection with railroad-cars can be as advantageously used as the finished and perfect pin.

Figure 6:
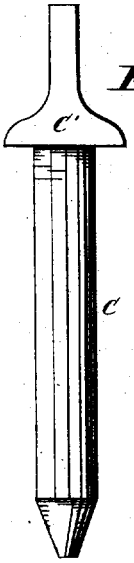
Figure 7:
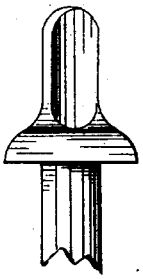

On Sheet 2 are shown the compound dies that flatten and draw out the stock above the collar and press the head of the bar from the form shown at C′, Fig. 5, into the flat form shown at Fig. 6. The dies which accomplish this are shown at D and E, Figs. 3 and 4, and their relative position and arrangement when in action or in the act of flattening the end of the pin are shown in Fig. 3. The die E is a solid-center traveling die, and is constructed of steel, and is so secured in its yoke or other bearing as to allow of its adjustment. D is a stationary die, and is constructed in sections, the center elbow shaped plate, *d*, of which is steel and the side plates, *d′ d′*, of which are made of cast-iron or any other suitable material. These plates are connected in the usual manner, and form, as it were, an open-box die, in which the die E enters and works. The face of the die E and the plate *d* are of such form as to give to the head of the bar the flat faces shown in Figs. 6 and 7, while their rounded corners *e e* give to the lower section of the flattened head the curve *c′*, which meets the curve of the collar and which forms in connection therewith the double or reverse curve.

The operation of these dies will be readily understood. The round bar C, having had the collar *c* formed thereon, as described, and through the action of the dies A, A′, and B, is now, in the form shown in Fig. 5, inserted in against the inner face, *d′*, of the die D, as shown in Fig. 3, and then, through the forward movement of the die E, has its head pressed, flattened, and drawn out, as shown in Fig. 6. The operation having been completed, the returnmovement of the die E commences, when the pressed pin can be withdrawn, and another, to be flattened and drawn out, inserted.

The great advantage of thus constructing and arranging these dies D E is that when the dies become unduly worn they can be refitted or refaced simply by planing off their worn surfaces, and then placed together, as before, which, in connection with the fact that the die E is so secured in its yoke or bearing as to be adjustable, permits of this refacing of the dies at pleasure without enlarging the cavity, and which permits of the dies always being kept in perfect working order, and at the same time greatly increasing their serviceable durability, the round iron bar having had a collar formed thereon through the action of the dies A, A′, and B, Sheet 1, and its head flattened and drawn out through the action of the dies D E, Sheet 2.

I will now proceed to describe the other and last operation—the necking and punching of the flattened head—which is accomplished by the dies and punch illustrated on Sheet 2.

F F′ are the dies which receive and retain the flat head C′ of the bar or pin C during the operation of necking and punching. The lower die, F, is stationary, and the other die, F′, has a vertical movement, but only sufficient to allow of the ready insertion of the pin and its withdrawal after the same has been necked and punched.

The faces *f f* of the dies may be so formed and attached as to permit of their ready removal when they become unduly worn and their replacement by new and fresh die-faces, and with this exception and the fact that the front section of the dies are cut away, so as to allow of the action of the swaging neck-dies between their flanges *f′ f′*, they and the punch are constructed and operate precisely as do the dies and punch in my patent before referred to.

G G′ are the swaging neck-dies, and their faces or cavities are of the form or contour shown at Fig. 10. These dies are exact counterparts of each other, and when brought together form an opening which is the exact form of the neck and head of the pin shown at Fig. 11, and into which form the head of the pin is swaged through the action of these dies. The die G is stationarily secured between the flanged surface-bearings *f′ f′* of the dies F F′, Fig. 8, and the die G′ works and travels between the same flanged bearings and is operated by the same movement as is the traveling swaging neck-die in my former patent.

The operation of the dies and punch is as follows: The die F′ being elevated sufficiently far to allow of the insertion of the flattened end of the bar, and the punch H elevated and the die G′ drawn back, the flattened head of the pin shown in Fig. 6 is inserted with its face resting on *f* and its edge against *g′* of the cavity in the die G. The die F′ now, through the movement of the machine, is forced down and clamps the end of the flattened bar, and the die G′ now moves forward, and its cavity *g*, in connection with the cavity *g* of the die G, gives the flattened head the contour shown at *h*, Fig. 11. The punch H is forced through the metal and the chain-eye *h′* is formed, which completes the operation and produces a finished pin. The die G′, through the movement of the machine, is returned, the die F′ elevated, and the punch is lifted, when the finished pin can readily be withdrawn and another inserted, and the operation herein described is repeated.

These dies may be constructed of any suitable material, and are cast or formed by any other suitable process.

What I claim as new, and desire to secure by Letters Patent of the United States, is—

1. The griping-dies A A′ and header or die B for developing the collar, in combination with the pointing-dies K K′, the whole being constructed and arranged to produce by their joint operations a car-coupling pin, as shown in Fig. 5, substantially as described.

2. The combination of the compound-die D and the die E, for flattening and drawing out the end of the bar, said dies being of the configuration shown, and constructed and arranged as stated, so as to permit of their being refaced and refitted without enlarging the cavity they form, substantially as and for the purpose specified.

3. The combination and construction of the dies F F′, swaging-dies G G′, and punch H, the whole being arranged and operated, as shown, for necking and punching the pin, substantially as described, and for the purpose specified.

4. The combination of the dies A, A′, and B, for forming a collar, dies K K′, for pointing the pin, the compound-dies D and the die E, for flattening and drawing out the end of the bar, and the dies F F′ and G G′ and punch H, for necking and holding the pin for the action of the punch, substantially as described.

5. In machines for making car-coupling pins, the dies F and F′, constructed and arranged to operate in combination with the swaging-dies G G′, substantially as described, and for the purpose set forth.

In evidence whereof I subscribe my name in presence of two witnesses.

CHARLES H. WILLIAMS.

Witnesses:

J. H. BURRIDGE,

M. L. DEERING.